United States Patent
Nishioka

(10) Patent No.: US 9,716,422 B2
(45) Date of Patent: Jul. 25, 2017

(54) MACHINE LEARNING METHOD AND MACHINE LEARNING APPARATUS LEARNING POINT OF CONNECTION OF GROUND WIRE OR SHIELD WIRE AND ELECTRIC MOTOR CONTROL APPARATUS AND ELECTRIC MOTOR APPARATUS PROVIDED WITH MACHINE LEARNING APPARATUS

(71) Applicant: FANUC CORPORATION, Yamanashi (JP)

(72) Inventor: Akira Nishioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/220,901

(22) Filed: Jul. 27, 2016

(65) Prior Publication Data
US 2017/0033648 A1 Feb. 2, 2017

(30) Foreign Application Priority Data
Jul. 31, 2015 (JP) ................. 2015-151862

(51) Int. Cl.
| | | |
|---|---|---|
| *G06F 15/18* | (2006.01) | |
| *H02K 11/33* | (2016.01) | |
| *H02K 11/40* | (2016.01) | |
| *H02K 11/01* | (2016.01) | |
| *H02K 11/20* | (2016.01) | |
| *H02K 11/35* | (2016.01) | |
| *G06N 99/00* | (2010.01) | |

(52) U.S. Cl.
CPC .......... *H02K 11/33* (2016.01); *G06N 99/005* (2013.01); *H02K 11/01* (2016.01); *H02K 11/20* (2016.01); *H02K 11/35* (2016.01); *H02K 11/40* (2016.01)

(58) Field of Classification Search
CPC ...... G06N 99/005; H02K 11/33; H02K 11/40; H02K 11/01; G06F 15/18
USPC ............ 706/12, 15, 21, 23, 25; 388/901; 318/565, 566, 567, 568.1, 400.01, 700, 318/701, 727, 430
See application file for complete search history.

(56) References Cited

U.S. PATENT DOCUMENTS

2016/0078363 A1* 3/2016 Hodel ............... G05B 13/0265
706/12

FOREIGN PATENT DOCUMENTS

| JP | 2004-098174 A | 4/2004 |
| JP | 2004-206962 A | 7/2004 |
| JP | 2004-248371 A | 9/2004 |

* cited by examiner

*Primary Examiner* — Antony M Paul
(74) *Attorney, Agent, or Firm* — Hauptman Ham, LLP

(57) ABSTRACT

A machine learning apparatus able to learn a point of connection of a ground wire or a shield wire optimal for reducing noise. It is a machine learning apparatus learning a point of connection of a ground wire or shield wire used in an electric motor apparatus provided with a status observing part and learning part. The status observing part observes a point of connection of a ground wire or shield wire and a feedback signal from an electric motor as status variables. The learning part learns a point of connection of a ground wire or a shield wire able to reduce noise included in the feedback signal in accordance with a training data set prepared based on the status variables.

7 Claims, 3 Drawing Sheets

MACHINE LEARNING METHOD AND MACHINE LEARNING APPARATUS LEARNING POINT OF CONNECTION OF GROUND WIRE OR SHIELD WIRE AND ELECTRIC MOTOR CONTROL APPARATUS AND ELECTRIC MOTOR APPARATUS PROVIDED WITH MACHINE LEARNING APPARATUS

RELATED APPLICATIONS

The present application claims priority to Japanese Application Number 2015-151862, filed Jul. 31, 2015, the disclosure of which is hereby incorporated by reference herein in its entirety.

BACKGROUND OF THE INVENTION

1. Field of the Invention

The present invention relates to a machine learning method and machine learning apparatus learning a point of connection of a ground wire or shield wire and an electric motor control apparatus and electric motor apparatus provided with that machine learning apparatus.

2. Description of the Related Art

An electric motor apparatus includes a ground wire connected to a housing of the electric motor to secure a ground potential and includes a shield wire provided with a shield for reduction of noise and connected to the same housing of the electric motor.

Japanese Patent Publication No. 2004-206962A, Japanese Patent Publication No. 2004-248371A, and Japanese Patent Publication No. 2004-098174A disclose various wiring structures for reducing the generation of noise.

SUMMARY OF INVENTION

The point of connection of a ground wire or a shield wire relies to a large extent on the knowledge of a skilled worker and accumulation of knowhow. The point of connection optimal for noise reduction is not necessarily selected. Further, along with the increasing complexity and increasing sophistication of control techniques, the opportunities for simultaneous use of a plurality of control devices are also increasing. The mechanism for generation of noise is also becoming more complicated. Therefore, art enabling the determination of the optimal point of connection of the ground wire or the shield wire for reduction of noise is being sought.

In a preferred embodiment of the present application, there is provided a machine learning apparatus learning a point of connection of a ground wire or a shield wire used in an electric motor apparatus, the machine learning apparatus comprising a status observing part observing the point of connection of the ground wire or the shield wire and a feedback signal from an electric motor as status variables and a learning part learning the point of connection of the ground wire or the shield wire reducing noise included in the feedback signal in accordance with a training data set prepared based on the status variables.

In a preferred embodiment of the present application, there is provided an electric motor control apparatus comprising the above machine learning apparatus, a connecting part connecting the ground wire or the shield wire to the point of connection, a signal acquiring part acquiring the feedback signal, and a decision-making part using a result learned by the learning part as the basis to determine a point of connection of the ground wire or the shield wire.

In a preferred embodiment of the present application, there is provided the electric motor control apparatus wherein the learning part comprises a reward calculating part using noise included in the feedback signal as the basis to calculate a reward and a function updating part using the reward as the basis to update a function for determining the point of connection of the ground wire or the shield wire.

In a preferred embodiment of the present application, in the electric motor control apparatus, the reward calculating part is configured to increase the reward when the noise is smaller than a predetermined threshold value and to decrease the reward when it is the threshold value or more.

In a preferred embodiment of the present application, in the electric motor control apparatus, the function updating part is configured so as to update an action value table in accordance with the reward.

In a preferred embodiment of the present application, there is provided an electric motor apparatus comprising the above electric motor control apparatus, an electric motor controlled by the electric motor control apparatus, and an encoder outputting the feedback signal.

In a preferred embodiment of the present application, there is provided a machine learning method learning a point of connection of a ground wire or a shield wire used in an electric motor apparatus, the machine learning method comprising observing the point of connection of the ground wire or the shield wire and a feedback signal from an electric motor as status variables and learning the point of connection of the ground wire or the shield wire reducing noise included in the feedback signal in accordance with a training data set prepared based on the status variables.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
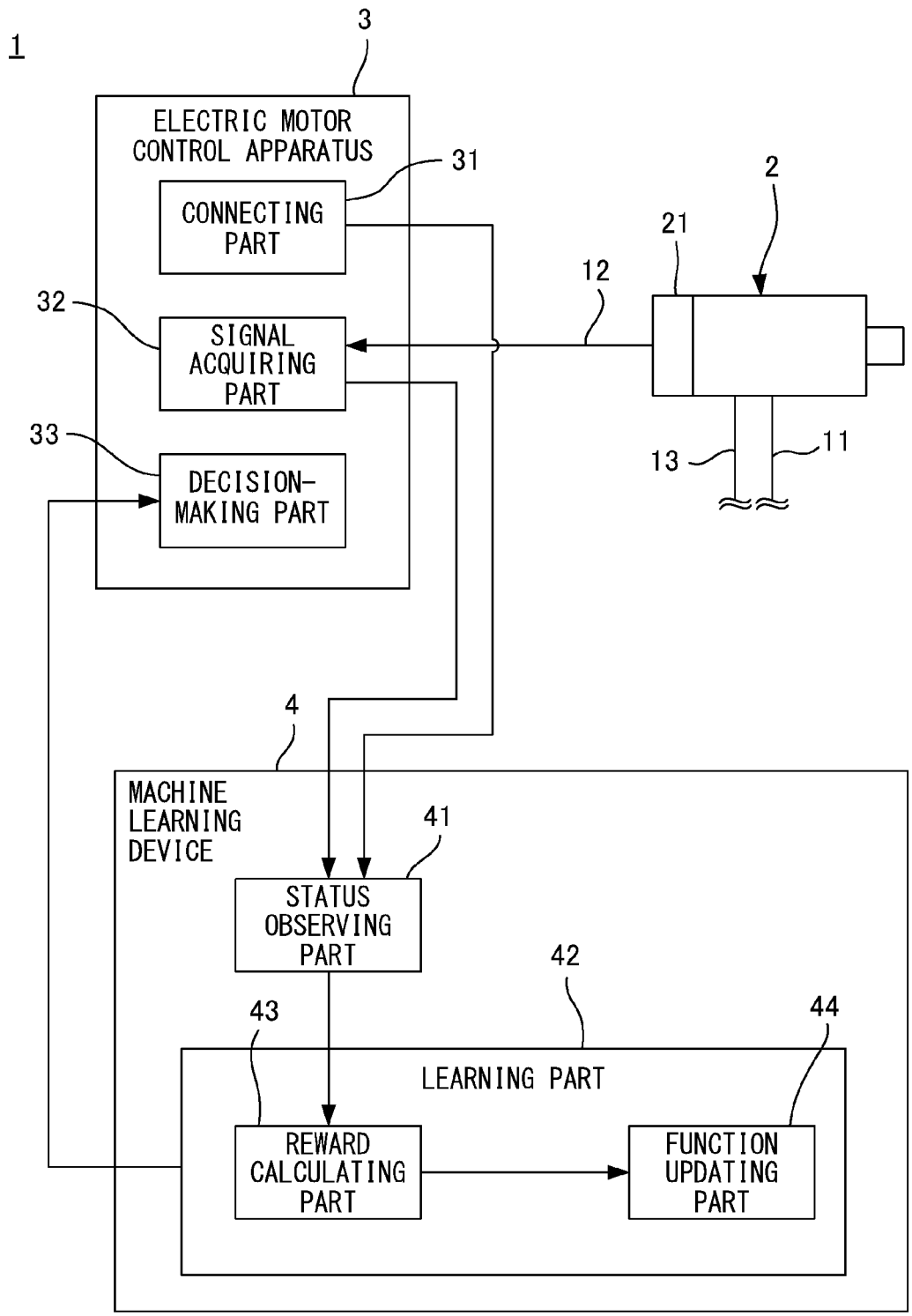
FIG. 1 is a block diagram of an electric motor apparatus according to one embodiment.

FIG. 1 is a block diagram of an electric motor apparatus according to one embodiment. The electric motor apparatus 1 has a machine learning function of learning a point of connection of a ground wire or a shield wire.

In this Description, a "ground wire" is a conductor which is connected to a housing of an electric motor 2 for grounding the electric motor 2. A "shield wire" is a conductor surrounded by a shield for reducing noise. A shield wire may include a power cable and an output signal line from an encoder 21.

The electric motor apparatus 1 includes an electric motor 2, an electric motor control apparatus 3 controlling the electric motor 2, and a machine learning apparatus 4 learning a point of connection of a ground wire or a shield wire.

The electric motor 2 provides drive power in response to electric power supplied in accordance with a torque command prepared by the electric motor control apparatus 3. The electric motor 2 includes an encoder 21 detecting a rotational position of the electric motor 2. A feedback signal output from the encoder 21 is input through an output signal line 12 (below, sometimes referred to as the "shield wire 12") to the electric motor control apparatus 3.

The electric motor 2 has not only the shield wire 12, but also a power line 13 used for supplying electric power (below, sometimes referred to as the "shield wire 13") connected to it. Further, the electric motor 2 further has a ground wire 11 grounding the electric motor 2 connected to it.

The electric motor control apparatus 3 is a digital computer including a CPU, ROM, RAM, nonvolatile memory, and interface connected to an outside device. The electric motor control apparatus 3, as shown in FIG. 1, includes a connecting part 31, signal acquiring part 32, and decision-making part 33.

The connecting part 31 connects the ground wire 11 or shield wires 12, 13 to the desired points of connection. In one embodiment, the connecting part 31 may be configured so as to change the point of connection by a transistor or other switching device.

In another embodiment, the connecting part 31 may be configured so that the connection process is performed through work by the operator. In this case, the connecting part 31 displays the point of connection of a ground wire 11 or a shield wires 12, 13 at a display device connected to the electric motor control apparatus 3. The operator refers to the displayed information and performs the connection work. Further, in another embodiment, the connecting part 31 may be configured so as to utilize an outside device, for example, a robot to perform a connection process.

The signal acquiring part 32 acquires a feedback signal showing position information of the electric motor 2 from the encoder 21. The signal acquiring part 32 outputs the acquired feedback signal to a status observing part 41.

The decision-making part 33 uses the result of learning by the machine learning apparatus 4 as the basis to determine the point of connection of a ground wire 11 or shield wires 12, 13.

Referring again to FIG. 1, the machine learning apparatus 4 includes a status observing part 41 and a learning part 42. The machine learning apparatus 4 may be housed inside the electric motor control apparatus 3 or may be a digital computer separate from the electric motor control apparatus 3. Alternatively, the machine learning apparatus 4 may be present in a crowd server.

The status observing part 41 observes the point of connection of a ground wire 11 or shield wires 12, 13 and a feedback signal from the electric motor 2 as status variables.

The learning part 42 learns the point of connection of a ground wire 11 or shield wires 12, 13 that are able to reduce noise contained in the feedback signal in accordance with the training data set prepared based on the status variables. In one embodiment, the learning part 42 learns the relationship between the point of connection of the ground wire 11 or the shield wires 12, 13 and the generation of noise in accordance with the concept of reinforcement learning.

The machine learning apparatus 4 according to the present embodiment performs reinforcement learning in accordance with the known technique of Q-learning. The machine learning apparatus 4 learns the best action based on the action value function Q(s,a) for finding the action value Q (expected value) when selecting the action "a" at the time of certain status variable "s".

At the initial stage of learning, the action value Q allocated to a combination of a certain status variable "s" and action "a" is unknown. The machine learning apparatus 4 randomly selects and performs an action "a" for various status variables "s" and cumulatively adds a reward given as a result of the action "a" to thereby update the action value function Q(s,a). The general formula for updating the action value function Q(s,a) is expressed by formula 1.

$$Q(s_t, a_t) \leftarrow Q(s_t, a_t) + \alpha\left(r_{t+1} + \gamma \max_{a} Q(s_{t+1}, a) - Q(s_t, a_t)\right) \quad \text{(Formula 1)}$$

Here, $s_t$ is a status variable at the time "t". $a_t$ is an action performed at the time "t". $s_{t+1}$ is a status variable at the time t+1, in other words, a status variable after change as a result of action $a_t$. $r_{t+1}$ is a reward given corresponding to the environment changing as a result of the action $a_t$. The term "max" expresses the maximum value of the action value Q at the status variable $s_{t+1}$ (that is, the action value with respect to the best action "a"). $\gamma$ is a discount rate. If set so that $0<\gamma\le1$ (for example, $\gamma=0.9\sim0.99$). "$\alpha$" is a learning coefficient. It is set so that $0<\alpha\le1$ is satisfied (for example, $\alpha=0.05\sim0.2$).

If the action value of the best action "a" at the time t+1 represented by the updating formula representing the formula 1 is larger than the action value Q of the action "a" performed at the time "t", the action value Q is made larger, while in the opposite case, the action value Q is made smaller. In other words, the action value function Q(s,a) is updated so as to make the action value Q of the action "a" at the time "t" approach the best action value at the time t+1. Due to this, the best action value in a certain environment is successively propagated to the action value at the previous environment.

Referring again to FIG. 1, the learning part 42 further includes a reward calculating part 43 and a function updating part 44.

The reward calculating part 43 uses the noise included in the feedback signal from the encoder 21 as the basis to calculate a reward "r". For example, when the level of noise is smaller than a predetermined threshold value, it increases the reward "r" (for example, gives a reward of "1"), while when the level of noise is the threshold value or more, it decreases the reward "r" (for example, gives reward of "−1"). The noise is extracted in accordance with a known method. For example, a capacitor can be used to extract an AC component from the feedback signal to extract the noise.

The function updating part 44 updates the function for determining the point of connection of a ground wire 11 or shield wires 12, 13 in accordance with a reward calculated by the reward calculating part 43. The function can be updated by updating for example an action value table in accordance with a training data set. The action value table is a data set linking any action and an action value and stored in the form of a table.

Figure 2:
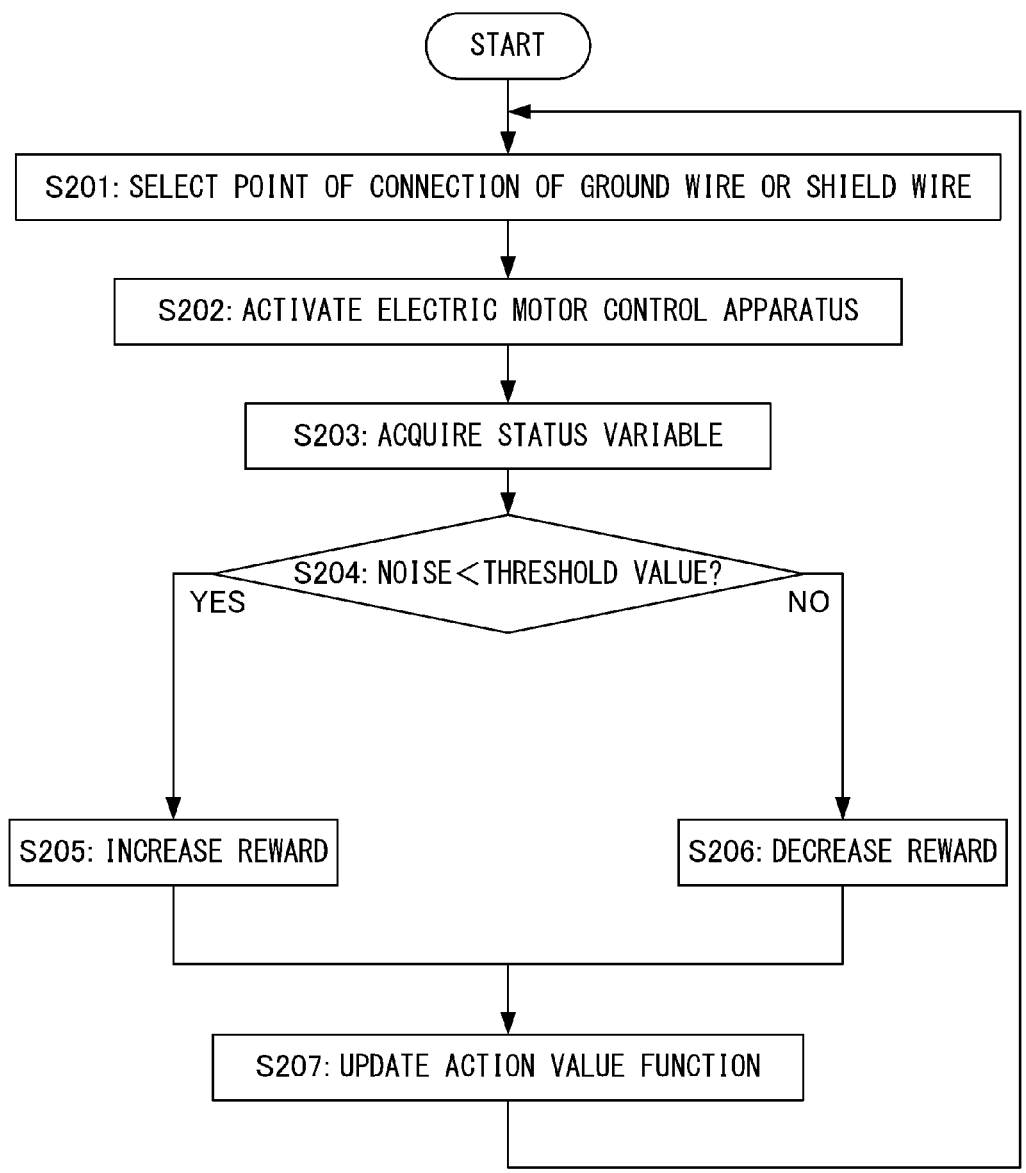
FIG. 2 is a flow chart showing a flow of machine learning according to one embodiment.

Next, referring to the flow chart shown in FIG. 2, the reinforcement learning method updating the action value Q(s,a) will be explained. At step S201, the connecting part 31 selects the point of connection of a ground wire 11 or shield wires 12, 13. The connecting part 31 randomly selects the point of connection.

At step S202, the electric motor control apparatus 3 is activated to acquire a feedback signal from the encoder 21.

At step S203, the status observing part 41 acquires status variables from the connecting part 31 and the signal acquiring part 32. The status variables "s" include the point of connection of a ground wire 11 or shield wires 12, 13 and a feedback signal. Note that, to detect noise included in a feedback signal as accurately as possible, it is preferable to utilize a feedback signal acquired when the electric motor 2 is stopped as the status variable "s".

At step S204, it is judged if noise contained in the feedback signal has fallen below a predetermined threshold value. If the result of judgment of step S204 is affirmative (if noise is smaller than threshold value), the routine proceeds to step S205. At step S205, the reward calculating part 43 increases the reward "r" so that the action value Q for the action of the connecting part 31 (selection of location of connection of ground wire or shield wires 12, 13) increases.

Next, when the result of judgment at step S204 is negative (when noise is a threshold value or more), the routine proceeds to step S206. At step S206, the reward calculating part 43 decreases the reward "r" so that the action value Q with respect to an action of the connecting part 31 falls.

At step S207, using the reward "r" calculated at step S205 or step S206 as the basis, the function updating part 44 updates the action value function Q(a,s). After that, the routine returns again to step S201 where the connecting part 31 selects the next point of connection. After that, with respect to the newly selected point of connection, an action value Q is found corresponding to the magnitude of the level of the noise. The processing of steps S201 to S207 is repeatedly performed at predetermined periods.

Figure 3:
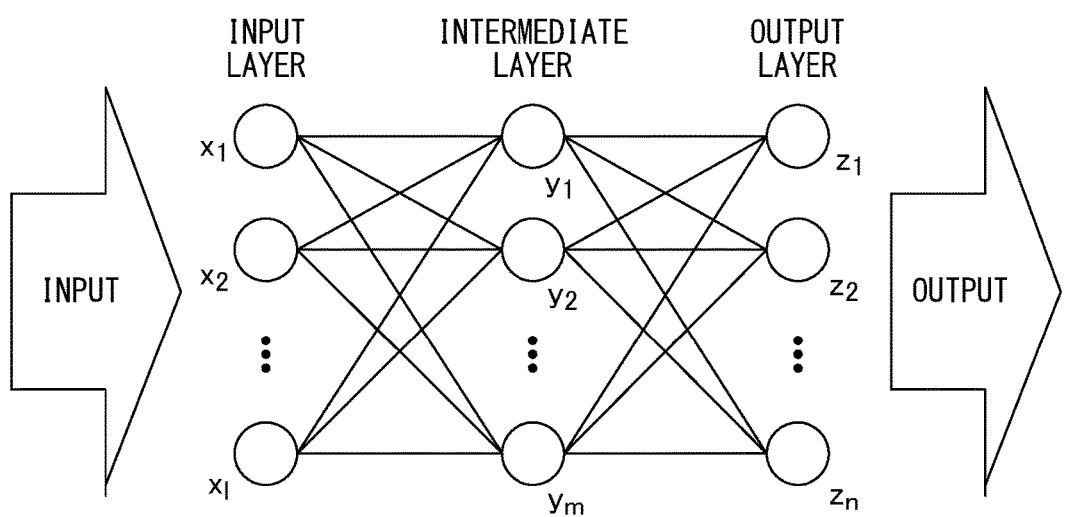
FIG. 3 is a view showing an example of the configuration of a neural network.

In another embodiment, the machine learning apparatus 4 may also perform machine learning in accordance with a neural network model. FIG. 3 shows an example of a neural network model. The neural network is comprised of an input layer including "l" number of neurons $x_1, x_2, x_3, \ldots, x_l$, an intermediate layer (hidden layer) including "m" number of neurons $y_1, y_2, y_3, \ldots, y_m$, and an output layer including "n" number of neurons $z_1, z_2, z_3, \ldots, z_n$. Note that, in FIG. 3, the intermediate layer is shown by just one layer, but two or more intermediate layers may also be provided.

The neural network learns the relationship between the point of connection of a ground wire 11 and shield wires 12, 13 and the generation of noise so that a person senses and learns the optimum action based on successful experiences or failed experiences. The neural network learns the relationship between the status variables and environmental changes based on a training data set prepared based on status variables observed by the status observing part 41 by so-called "supervised learning." According to the present embodiment, the decision-making part 33 of the electric motor control apparatus 3 functions so that the output layer determines the optimum point for connection in response to past points for connection input to the input layer of the neural network.

The decision-making part 33 of the electric motor control apparatus 3 utilizes the results of learning by the machine learning apparatus 4 to determine the point of connection of a ground wire 11 or shield wires 12, 13. In this regard, after the point of connection is determined once, sometimes noise increases due to aging of the ground wire 11 or shield wires 12, 13. The machine learning apparatus 4 according to the present embodiment is already learning the candidates for the point of connection, so the decision-making part 33 of the electric motor control apparatus 3 can determine where to switch the point of connection according to need.

Furthermore, the machine learning apparatus 4 can learn the relationship between past points of connection and generation of noise. Therefore, when a tendency for increase of noise due to aging of a ground wire 11 or shield wires 12, 13 is observed, the decision-making part 33 may be configured to switch the points of connection.

According to an electric motor apparatus provided with a machine learning apparatus and machine learning method according to the present embodiment, the relationship between a point of connection and the generation of noise is autonomously learned. Further, based on the results of learning, the decision-making part 33 determines the optimal point of connection of the ground wire 11 or shield wires 12, 13. Therefore, even without knowledge of skilled workers or accumulation of knowhow, noise reduction becomes possible. There is no need for trial and error, so the work efficiency is improved.

According to the present embodiment, it is possible to predict aging of the ground wire 11 or shield wires 12 and 13, so it is possible to change the points of connection before the operation of the electric motor 2 is affected and prevent mistaken operation or a drop in precision.

In one embodiment, the learning part may be configured to learn an optimum point of connection in accordance with a training data set prepared for a plurality of electric motor apparatuses. The learning part may acquire the training data set from a plurality of electric motor apparatuses used on the same work floor. Alternatively, it may utilize a training data set collected from a plurality of electric motor apparatuses operating independently on different work floors to learn a point of connection of a ground wire or shield wire.

While an embodiment utilizing reinforcement learning and a neural network for machine learning was explained, another known method, for example, genetic programming, functional logic programming, support vector machine, etc., may also be used for machine learning.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the machine learning apparatus and machine learning method according to the present invention, the relationship between the point of connection of a ground wire or a shield wire and the generation of noise is autonomously learned. Therefore, it is possible to determine the optimum point of connection without the knowledge of a skilled worker or accumulation of knowhow. Further, the electric motor control apparatus and electric motor apparatus according to the present invention are optimized in point of connection of a ground wire or a shield wire by the machine learning apparatus, so effective noise reduction becomes possible.

What is claimed is:

1. A machine learning apparatus learning a point of connection of a ground wire or a shield wire used in an electric motor apparatus, the machine learning apparatus comprising a status observing part observing the point of connection of the ground wire or the shield wire and a feedback signal from an electric motor as status variables and a learning part learning the point of connection of the ground wire or the shield wire reducing noise included in the feedback signal in accordance with a training data set prepared based on the status variables.

2. An electric motor control apparatus comprising:

a machine learning apparatus according to claim 1, a connecting part connecting the ground wire or the shield wire to the point of connection, a signal acquiring part acquiring a feedback signal, and a decision-making part using a result learned by the learning part as the basis to determine the point of connection of the ground wire or the shield wire.

3. The electric motor control apparatus according to claim 2, wherein the learning part comprises a reward calculating part using noise included in the feedback signal as the basis to calculate a reward and a function updating part using the reward as the basis to update a function for determining the point of connection of the ground wire or the shield wire.

4. The electric motor control apparatus according to claim 3, wherein the reward calculating part is configured to increase the reward when the noise is smaller than a predetermined threshold value and to decrease the reward when it is the threshold value or more.

5. The electric motor control apparatus according to claim 3, wherein the function updating part is configured so as to update an action value table in accordance with the reward.

6. An electric motor apparatus comprising an electric motor control apparatus according to claim 2, an electric motor controlled by the electric motor control apparatus, and an encoder outputting the feedback signal.

7. A machine learning method learning a point of connection of a ground wire or a shield wire used in an electric motor apparatus, the machine learning method comprising observing the point of connection of a ground wire or shield wire and a feedback signal from an electric motor as status variables and learning the point of connection of the ground wire or the shield wire reducing noise included in the feedback signal in accordance with a training data set prepared based on the status variables.

* * * * *